United States Patent [19]

Forschirm et al.

[11] 4,346,209

[45] Aug. 24, 1982

[54] SOLVENT RESISTANT HALOGENATED AROMATIC POLYESTER FIBERS AND PROCESS THEREFOR

[75] Inventors: Alex S. Forschirm, Parsippany; Arnold J. Rosenthal, Whippany, both of N.J.

[73] Assignee: Celanese Corporation, New York, N.Y.

[21] Appl. No.: 208,204

[22] Filed: Nov. 19, 1980

[51] Int. Cl.$^3$ ..................... C08G 63/18; D06M 13/08
[52] U.S. Cl. .................................... 528/191; 8/130.1; 264/235; 264/343; 264/346; 528/497; 528/502
[58] Field of Search ................. 8/130.1; 528/190, 191, 528/193, 497, 502; 264/343, 235, 346

[56]  References Cited
U.S. PATENT DOCUMENTS

| | | | |
|---|---|---|---|
| 3,481,685 | 12/1969 | White | 8/130.1 |
| 3,616,504 | 11/1971 | Otto | 8/130.1 |
| 3,617,204 | 11/1971 | Pirie | 8/130.1 |
| 3,620,666 | 11/1971 | Lenz et al. | 8/130.1 |
| 3,660,554 | 5/1972 | Okamura | 264/343 |
| 4,065,432 | 12/1977 | Frazer | 264/176 F |
| 4,083,929 | 4/1978 | Calundann et al. | 528/190 |
| 4,161,470 | 7/1979 | Calundann et al. | 528/190 |
| 4,184,996 | 1/1980 | Calundann et al. | 528/193 |
| 4,219,461 | 8/1980 | Calundann et al. | 528/190 |

Primary Examiner—Jay H. Woo

[57] ABSTRACT

Solvent resistant halogenated aromatic polyester fibers are prepared by first heat treating the fibers at substantially constant length at a temperature of from about 270° to about 295° C. for a period of from about 5 to about 60 minutes, and then further treating the fibers with perchloroethylene which is at a temperature of from about 80° C. up to its boiling point for a period of at least about 15 minutes to produce halogenated aromatic polyester fibers having improved solvent resistance.

10 Claims, No Drawings

SOLVENT RESISTANT HALOGENATED AROMATIC POLYESTER FIBERS AND PROCESS THEREFOR

BACKGROUND OF THE INVENTION

Halogenated aromatic polyesters such as the condensation products of 4,4'-isopropylidene-2,2',6,6'-tetrachlorodiphenol or 4,4'-isopropylidene-2,2',6,6'-tetrabromodiphenol with isophthalic acid and/or terephthalic acid or the ester-forming derivatives thereof have been used to produce a number of inherently non-burning fibrous materials which are particularly advantageous when fibrous articles are required for use in fire-control environments, such as children's sleepwear, suits for fire fighters, hospital furnishings, and uniforms for military and civilian personnel. However, these halogenated aromatic polyesters are sensitive to organic solvents such as perchloroethylene, which is a commercial dry cleaning solvent.

Copending patent application U.S. Ser. No. 208,364, entitled "Improved Process for Drawing Halogenated Aromatic Polyester Fibers", filed concurrently herewith by Albert G. Williams, discloses a process for drawing halogenated aromatic polyester fibers at a temperature of from about 315° to about 355° C. at a draw ratio of from about 3:1 to about 10:1 to produce halogenated aromatic polyester fibers having improved tensile properties. To some extent, this drawing process also improves the solvent resistance of the fibers. However, some solvent sensitivity of present even after the halogenated aromatic polyester is drawn at these high draw ratios and elevated temperatures.

U.S. Pat. No. 3,684,766 and U.S. Pat. No. 3,780,148 describe a process for crystallizing a low molecular weight polyester with non-halogenated crystallizing agents prior to a second stage reaction.

In copending patent application U.S. Ser. No. 208,363, entitled "Solvent Resistant Halogenated Aromatic Polyester Fibers And Process Therefor" and filed concurrently herewith by Albert G. Williams, a process is disclosed for improving the solvent resistance of halogenated aromatic polyester fibers. This process comprises heat treating the halogenated aromatic polyester fibers at a temperature of from about 270° to about 295° C. for from about 5 to about 60 minutes to produce modified halogenated aromatic polyester fibers capable of withstanding 5 to 20 minute immersions in perchloroethylene which is at a temperature of from about 60° to about 70° C. Although this process improves the solvent resistance of halogenated aromatic polyesters such that they are resistant to dry cleaning solvents under relatively mild conditions, the search has continued for methods for improving even further the solvent resistance of halogenated aromatic polyesters. This invention was made as a result of that search.

OBJECTS AND SUMMARY OF THE INVENTION

Accordingly, a general object of the present invention is to avoid or substantially alleviate the above problems of the prior art.

A more specific object of the present invention is to provide a process for improving the solvent resistance of halogenated aromatic polyester fibers.

A further object of the present invention is to provide halogenated aromatic polyester fibers which possess improved solvent resistance.

Other objects and advantages of the present invention will become apparent from the following summary and description of the preferred embodiments of the present invention.

In one aspect, the present invention provides a process for improving the solvent resistance of halogenated aromatic polyester fibers. The halogenated aromatic polyester contains at least some isophthaloyl halide/bisphenol isomer of the polyester. The fibers have been heat treated at substantially constant length at a temperature of from about 270° to about 295° C. for a period of from about 5 to about 60 minutes to produce a modified halogenated aromatic polyester fiber. This process comprises further treating the modified halogenated aromatic polyester fibers with perchloroethylene which is at a temperature of from about 80° C. up to its boiling point for a period of at least about 15 minutes to produce halogenated aromatic polyester fibers having improved solvent resistance.

In another aspect, the present invention provides halogenated aromatic polyester fibers having improved solvent resistance.

DESCRIPTION OF THE PREFERRED EMBODIMENTS

Halogenated aromatic polyesters having recurring units of the structural formula:

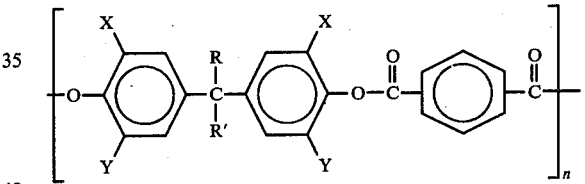

wherein X, which may be the same or different, may be chlorine or bromine, Y, which may be the same or different, may be hydrogen, chlorine, or bromine, R and R' may be the same or different and represent lower alkyl groups (e.g., having from 1 to about 5 carbon atoms), hydrogen, or together constitute a cyclic hydrocarbon group, and n equals at least 10 (e.g., n equals about 40 to 400, typically about 50). Commonly the aromatic polyester utilized in accordance with the process of this invention has a chlorine and/or bromine content of about 15% to 60% by weight based upon the weight of the aromatic polyester (e.g., a chlorine and/or bromine content of about 15% to 50% by weight). As is apparent from the structural formula, the aromatic polyester is chlorinated and/or brominated in the sense that these substituents are directly attached to an aromatic ring. Preferably the halogen substituents are all bromine.

The halogenated aromatic polyesters conforming to the above-defined formula may be prepared in high molecular weight by either interfacial polymerization or solution polymerization techniques as described in U.S. Pat. No. 3,234,167 which is hereby incorporated by reference. The solution polymerization method is preferred and will be described in detail herein. In this solution polymerization method, substantially equimolar amounts of (1) an appropriate bisphenol, and (2) a diacid halide such as isophthaloyl chloride or mixtures thereof with terephthaloyl chloride are reacted.

Initially the appropriate bisphenol is dissolved in a suitable solvent. A catalyst or acid acceptor is also dissolved in the solvent prior to the addition of the diacid halide.

The bisphenols which are useful in the preparation of the polyesters having recurring units of the formula illustrated above have the structure:

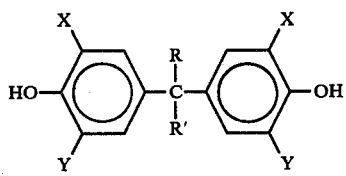

where X, Y, R and R' have the same significance as set forth hereinabove. Suitable bisphenols which are useful in the practice of this invention include bis(3,5-dibromo-4-hydroxyphenyl)methane; bis(3,5-dichloro-4-hydroxyphenyl)methane; bis(3-chloro-5-bromo-4-hydroxyphenyl)methane; 1,1-bis(3,5-dibromo-4-hydroxyphenyl)ethane; 1,1-bis-(3,5-dichloro-4-hydroxphenyl)ethane; 1,1-bis-(3-chloro-5-bromo-4-hydroxyphenyl)ethane; 1,1-bis-(3,5-dibromo-4-hydroxyphenyl)propane; 1,1-bis-(3,5-dichloro-4-hydroxyphenyl)propane; 1,1-bis-(3-chloro-5-bromo-4-hydroxphenyl)propane; 2,2-bis-(3,5-dibromo-4-hydroxyphenyl)propane; 2,2-bis-(3,5-dichloro-4-hydroxyphenyl)propane; 2,2-bis-(3-chloro-5-bromo-4-hydroxyphenyl)methane; bis-(3-bromo-4-hydroxyphenyl)methane; bis-(3-chloro-4-hydroxphenyl)methane; 3-bromo-3'-chloro-bis(4-hydroxyphenyl)methane; 1,1-bis-(3-bromo-4-hydroxyphenyl)ethane; 1,1-bis-(3-chloro-4-hydroxylphenyl)ethane; 3-bromo-3'-chloro-bis-(4,4'-hydroxyphenyl)ethane; 1,1'-bis-(3-bromo-4-hydroxyphenyl)propane; 1,1'-bis(3-chloro-4-hydroxyphenyl)propane; 1,1'-(3-chloro-3'-bromo-bis-[4,4'-hydroxyphenyl])propane; 2,2'-bis-(3-bromo-4-hydroxyphenyl)propane; 2,2'-bis-(3-chloro-4-hydroxyphenyl)propane; 2,2'-(3-bromo-3'-chloro-bis[4,4'-hydroxyphenyl])propane; as well as their alkali metal salts.

Preferred bisphenols are 2,2-bis-(3,5-dibromo-4-hydroxyphenyl)propane, also known as tetrabromobisphenol A, and 2,2-bis-(3,5-dichloro-4-hydroxyphenyl)propane, also known as tetrachlorobisphenol A.

Many brominated bisphenols of the above-described structure are commercially available and may be prepared by the condensation of a lower alkyl ketone or aldehyde with two molecules of the phenol and subsequently brominating and/or chlorinating the unsubstituted phenol. This reaction is usually carried out with or without an inert solvent in the presence of an acid. This reaction is summarized in the case of X and Y being bromine in the following equations wherein R and R' have the meanings hereinabove described.

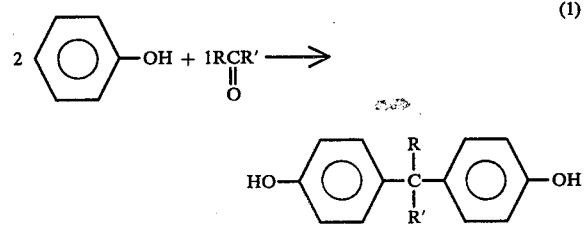

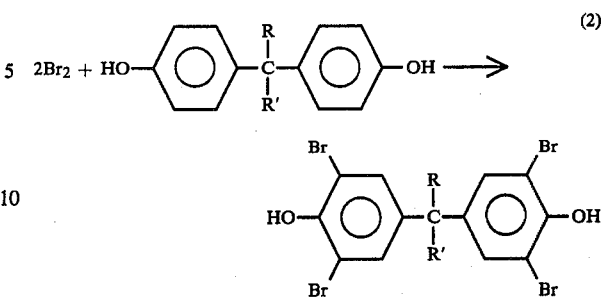

The solvent in which the bisphenol and catalyst or acid acceptor are dissolved and in which the reaction takes place should be inert and incapable of reacting with any of the components present therein. Furthermore, the solvent should be a solvent for both the starting materials as well as the resulting polymer. This allows the solvent to help maintain the forming polymer in a more workable form.

Suitable solvents which may be utilized in the solution polymerization technique described herein include chloroalkanes and aromatic and chloroaromatic compounds. Examples of such compounds include methylene chloride, chloroform, tetrachloroethane, trichloroethane, chlorobenzene, chlorotoluene, dichloroethane, benzene, toluene, and xylene.

The catalyst or acid acceptor is preferably a tertiary amine which is capable of undergoing a reaction with the bisphenol to form a complex salt. The bisphenol complex salt subsequently reacts with the diacid halide and liberates an amine halide.

Stoichiometric amounts of the bisphenol and the catalyst would require a ratio of the tertiary amine to the bisphenol of about 2:1. However, it has been found that in order for the reaction to proceed at a commercially acceptable rate, an excess of acid acceptor should be employed. The amount of excess acid acceptor is generally less than about 50, typically less than about 20, and preferably less than about 5 percent by weight based upon the stoichiometric amount of acid acceptor required. The upper limit of acid acceptor is not critical. However, it should be remembered that excess amounts of acid acceptor should be neutralized and the reaction product of the neutralization reaction separated from the final polymer product.

Representative examples of suitable tertiary amine catalysts or acid acceptors include triethylamine, diamino-2,2,2,bicyclo octane, tripropyl amine, dimethyl aniline, pyridine, dimethyl amine and benzyl amine. Triethylamine is a preferred acid acceptor.

It will be noted that halogenated aromatic polyesters are prepared by the condensation of bisphenols with the diacid halides of isophthalic acid or mixtures thereof with the diacid halide of terephthalic acid. The use of a diacid halide as opposed to other corresponding derivatives is important in that it is normally not possible to directly prepare polymers from bisphenols and free acids. These acid halides may be derived from the corresponding dicarboxylic acids by any one of several methods well known in the art such as by reacting the respective acids with thionyl chloride. Thus, the diacid halide is preferably utilized in the form of a diacid chloride.

It is generally preferred to dissolve the diacid halide in the same type of solvent utilized to prepare the solution containing the halogenated bisphenol. Although this is not critical, the employment of a solvent provides for a more accurate control of the addition of the diacid halide to the bisphenol containing solution.

In preparing a preferred brominated aromatic polyester, the diacid halide will generally be utilized in the form of an aromatic acid chloride mixture of from about 45 to about 75%, preferably from about 55 to about 65% (e.g., 60%) by weight isophthaloyl chloride and correspondingly from about 25 to about 55%, preferably from about 35 to about 45% (e.g., 40%) by weight terephthaloyl chloride.

In preparing a preferred chlorinated aromatic polyester, the diacid halide will generally be utilized as an aromatic acid chloride mixture of from about 40 to about 90%, preferably from about 60 to about 80% (e.g., 70%) by weight isophthaloyl chloride, and correspondingly from about 10 to about 60%, preferably from about 20 to about 40% (e.g., 30%) by weight terephthaloyl chloride.

For smooth operation in a stirred solution, the resulting polymer product preferably should be about 10% or less on the basis of the total weight of the solvent although percentages as high as 25% may be utilized depending upon the molecular weight of the polymer.

Generally substantially stoichiometric amounts of each reactant are employed. Typical molar amounts of from about 1:0.9:0.1 to about 1:0.4:0.6, of the ratio of bisphenol, isophthaloyl chloride, and terephthaloyl chloride, respectively, may be utilized when preparing a chlorinated aromatic polyester. Typical molar amounts of from about 1:0.45:0.55 to about 1:0.75:0.25 of the ratio of bisphenol, isophthaloyl chloride, and terephthaloyl chloride, respectively, may also be utilized when preparing a brominated aromatic polyester.

The polymerization reaction may be carried out in a batch, semi-continuous, or continuous manner, as desired. However, in a preferred embodiment, the reaction is carried out in a continuous manner, by which the reactants are continuously introduced into the reaction zone and the polymer product is continuously prepared and withdrawn. This may be achieved, for example, by utilizing a cylindrical tube, having static mixers as a reaction vessel. The bisphenol containing solution is passed through the tube while adding the diacid halide at various points along the longitudinal axis of the tube. Thus, the diacid halide is added in large amounts at the upstream portion of the tube and in gradually decreasing amounts at positions further downstream in the tube.

The final concentration of the polymer in solution is from about 3 to about 25, typically from about 5 to about 20 and preferably from about 7 to about 15, percent by weight of the total reaction mixture. At these concentrations, the solution viscosity will generally vary from about 1 to about 3000 poise, typically from about 5 to about 2000 poise, and preferably from about 10 to about 1000 poise.

Polymerization is effected at temperatures which may vary from about 0 to about 200, typically from about 10 to about 100, and preferably from about 15 to about 50° C., and at corresponding autogenous pressures which are due to the vapor pressure of the solvent at the aforenoted temperatures which may vary from about 0.2 to about 26, typically from about 0.3 to about 4.8, and preferably from about 4.0 to about 1.4, atmospheres.

Agitation of the reactants should be sufficient to evenly disperse the diacid halide throughout the bisphenol containing solution to avoid a build-up of the concentration of the diacid halide in a localized area within the reaction mixture. Such agitation may be supplied by any of the standard means of mixing such as by stirrer, shaker, static mixer, spray nozzle or other flow agitating systems.

The present process typically employs reaction times of generally from about 0.1 to about 20, typically from about 1 to about 10, and preferably from about 2 to about 6, hours when conducted on a batch basis. Polymerization conducted on a continuous basis will typically employ shorter polymerization times depending on the degree of mixing.

At the conclusion of the polymerization reaction, the polymer solution which contains tertiary amine hydrochloride and unreacted tertiary amine must be treated with hydrogen chloride to neutralize the unreacted tertiary amine. This hydrogen chloride may be in the form of an aqueous hydrochloric acid solution, or, in a preferred embodiment as disclosed in copending patent application U.S. Ser. No. 208,366, now U.S. Pat. No. 4,322,521, entitled "Improved Process for Producing Halogeneated Aromatic Polyesters", filed concurrently herewith by Albet G. Williams, the hydrogen chloride may be introduced in the form of gaseous, substantially anhydrous, hydrogen chloride. The disclosure of the above-identified patent application is hereby incorporated by reference.

After neutralization of the tertiary amine the tertiary amine hydrochloride is removed from the polymer containing solution. This may be accomplished by multiple batch extraction with water or by employing the continuous countercurrent extraction method disclosed in copending patent application U.S. Ser. No. 208,201, entitled "Continuous Countercurrent Extraction Process for Removing Water-Soluble Impurities From Water Immiscible Polymer Solutions", filed concurrently herewith by Albert G. Williams. The disclosure of this patent application is hereby incorporated by reference.

After removal of the water-soluble impurities, the halogenated aromatic polyester may be recovered in any suitable manner such as evaporation of the solvent or by precipitation of the polymer in a suitable non-solvent such as acetone or methanol. The polymer may then be isolated in solid form and dissolved in a suitable solvent at a concentration sufficient to achieve the desired spinning dope viscosity or concentrated without isolation to the desired spinning dope viscosity by employing the method disclosed in copending patent application U.S. Ser. No. 208,202, entitled "Flash Evaporation Process for Concentrating Polymer Solutions", filed concurrently herewith by Albert G. Williams, and thereafter processed for shaping. The disclosure of this patent application is hereby incorporated by reference.

The halogenated aromatic polyesters may be dissolved in a suitable spinning or casting solvent, such as methylene chloride or tetrahydrofuran and formed into a shaped aritcle, such as a fiber or film.

The halogenated aromatic polyester fibers may then be drawn in order to produce fibers having improved tensile properties. A preferred method for drawing these fibers is disclosed in copending patent application U.S. Ser. No. 208,364, entitled "Improved Process for Drawing Halogenated Aromatic Polyester Fibers", filed concurrently herewith by Albert G. Williams. This process comprises drawing the fiber at a draw ratio of from about 3:1 to about 10:1 and a temperature of from about 315 to about 355° C. to produce fibers having improved tensile properties. The disclosure of the above-identified patent aplication is hereby incorporated by reference.

The solvent resistance of the halogenated aromatic polyester fibers is improved by heat treating the fibers at substantially constant length at a temperature of from about 270° to about 295° C. for a time of from about 5 to about 60 minutes. By "substantially constant length" is meant that the fibers' length is kept constant to within ±5%. This process is described in detail in copending patent application U.S. Ser. No. 208,363, entitled "Solvent Resistant Halogenated Aromatic Polyester Fibers and Process Therefor", filed concurrently herewith by Albert G. Williams. The disclosure of this patent application is hereby incorporated by reference.

The solvent resistance of these polymers may be further improved in accordance with the present invention by treating the fibers with perchloroethylene which is at a temperature of from about 80° C. up to its boiling point, for a period of generally at least about 15, typically at least about 30, and preferably at least about 60 minutes. The perchloroethylene is preferably at a temperature above about 100° C. Boiling perchloroethylene is particularly preferred. The perchloroethylene used in the process of the present invention may be either substantially pure perchloroethylene or a commercially available perchloroethylene containing composition such as Perclene dry cleaning composition which comprises perchloroethylene and surfactant additives.

The treatment with hot perchloroethylene may be carried out in any apparatus known to those having ordinary skill in this art, preferably a boiling chamber, condenser, and recycling system.

It should be noted that the treatment of the fibers with hot perchloroethylene in accordance with the present invention is not effective to any significant extent without the heat treatment described hereinabove and in more detail in copending patent application U.S. Ser. No. 208,363, entitled "Solvent Resistant Halogenated Aromatic Polyester Fibers and Process Therefor", filed concurrently herewith by Albert G. Williams. However, when these fibers are so heat treated and then further treated with hot perchloroethylene in accordance with the process of the present invention, the solvent resistance of these fibers is greatly enhanced with respect to the solvent resistance of fibers which have been heat treated but not treated with hot perchloroethylene. For example, fibers which have been heat treated can withstand immersions of from 5 to 30 minutes in perchloroethylene which is at a temperature of from 60° to 70° C. without significant deterioration. When these fibers are first heat treated and then further treated with hot perchloroethylene in accordance with the process of the present invention, they can withstand immersions of from about 35 to about 60 minutes of perchloroethylene which is at a temperature of from about 75° to about 85° C.

That treatment of these fibers with hot perchloroethylene would yield modified fibers having improved solvent resistance is totally unexpected to one having ordinary skill in this art since it is known that such fibers when immersed in perchloroethylene at room temperature are substantially degraded. Also, when these fibers are treated with other solvents either at room temperature for 48 hours or for one hour at the boiling point of the solvent, either no change took place, the polymer dissolved, or it developed undesirable properties such as hardness or dullness. Such solvents include carbon tetrachloride, trichloroethylene, chlorobenzene, xylene, toluene, acetonitrile, benzylalcohol, 1,4-dioxane, methanol, 2-propanol, 2-phenoxyethanol, benzene, s-tetrachloroethane, acetone, acetic acid, ethylene glycol monomethyl ether, and water.

Although we do not wish to be bound by any particular theory, it is believed that the improved solvent resistance imparted to the halogenated aromatic polyester fibers when treated in accordance with the process of the present invention results from an increase in crystallinity of the polyester. This increase in crystallinity is believed to be imparted to the isophthaloyl halide/bisphenol isomer of the polyester mixture. The increase in crystallinity is demonstrated by X-ray crystallography.

The following Examples are given as specifc illustrations of the claimed invention. It should be understood, however, that the invention is not limited to the specific details set forth in the Examples. All parts and percentages in the Examples as well as in the remainder of the specification are by weight unless otherwise specified.

EXAMPLES 1-4

Two hundred one and seven tenths parts by weight tetrabromobisphenol A, 45.2 parts by weight isophthaloyl chloride and 30.1 parts by weight of terephthaloyl chloride are reacted to form a brominated aromatic polyester in the presence of about 2100 parts by weight methylene chloride solvent and 77.3 parts by weight of triethylamine acid acceptor.

The contents of the reaction zone are heated at atmospheric pressure at about 40° C. with agitation for 3 hours.

When the reaction is complete substantially anhydrous hydrogen chloride is bubbled through a gas sparge into the solution for five minutes until the excess triethylamine is neutralized, as determined by measuring the pH of the solution. The excess triethylamine is neutralized when the pH is reduced to below about 3.0. The pH is measured by determining the pH of the water layer of a mixture which is prepared by mixing 50% by weight reaction solution with 50% by weight distilled water.

The reaction mixture is then washed with water until a pH of 6 is achieved. The resulting brominated polyester is recovered by precipitation with methanol.

One hundred parts by weight of the brominated aromatic polyester are dissolved in 300 parts by weight of a methylene chloride spinning solvent. The solution is filtered and deaerated and extruded through a chrome plated stainless steel spinneret having 20 circular holes of 44 microns diameter each. The as-spun filamentary material is passed into an air chamber provided at 70° C. which flows concurrently and wherein the filamentary material is completely solidified and subsequently is taken up at a rate of 200 meters per minute.

The filamentary material next is hot drawn at a draw ratio of about 3:1 by contact with a 12 inch hot shoe provided at about 325° C. using the apparatus and method described in greater detail in U.S. Ser. No. 208,364, entitled "Improved Process for Drawing Halogenated Aromatic Polyester Fibers", and filed concurrently herewith by Albert G. Williams.

The drawn fiber is then heat treated at 290° C. for 10 minutes at constant length in an oven. The fiber is then immersed into a tube held in a thermostat at 121° C. which contains a solution of boiling (121° C.) Perclene dry cleaning solvent for the periods of time given in Table I.

TABLE I

| Example | Time |
| --- | --- |
| 1 | 15 |
| 2 | 30 |
| 3 | 60 |
| 4 | 120 |

In each case, the fiber remains intact without significant deterioration. Furthermore, the crystallinity of the brominated aromatic polyester as determined by wide angle X-ray crystallography is significantly increased in each case and the increase in crystallinity is greater as the Perclene treating time increases. The fibers which are so treated have improved solvent resistance and strength over fibers which are not so treated.

COMPARATIVE EXAMPLES

These Comparative Examples are conducted in order to indicate the solvent resistance of halogenated aromatic polyester fibers which are drawn and heat treated as in Example 1 but (A) not treated with Perclene dry cleaning solvent at all, and (B) treated with Perclene dry cleaning solvent which is at 25° C.

In both Comparative Examles, the polymer of Example 1 is prepared, and spun into fibers and the fibers are drawn and heat treated under the same conditions as in Example 1. In Comprative Example (A), the fibers are not further treated at all. In Comparative Example (B), the fibers are further treated with Perclene dry cleaning solvent which is at 25° C. for 15 minutes, as summarized in Table II, as follows:

TABLE II

| Comparative Example | Perclene Treatment |
| --- | --- |
| A | None |
| B | at 25° C. for 15 minutes |

In both Comparative Examples A and B, there is no substantial increase in the crystallinity of the brominated aromatic polyester and no substantial increase in the solvent resistance and strength of the fibers.

The Examples and Comparative Examples indicate the increased crystallinity which causes the improved solvent resistance of halogenated aromatic polyester fibers which are treated in accordance with the present invention over the solvent resistance of fibers which are not so treated.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in this art without departing from the spirit of the invention.

We claim:

1. Solvent resistant halogenated aromatic polyester fibers said polyester having recurring units of the structural

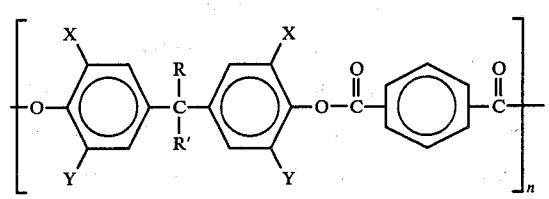

wherein X, which may be the same or different, may be chlorine or bromine, Y, which may be the same or different, may be hydrogen, chlorine, or bromine, R and R' may be the same or different and represent lower alkyl groups, hydrogen, or together constitute a cyclic hydrocarbon group, and n equals at least 10, and wherein said halogenated aromatic polyester contains at least some isophthaloyl halide/bisphenol isomer of said polyester, said fibers being first heat treated at substantially constant length at a temperature of from about 270° to about 295° C. for a period of from about 5 to about 60 minutes to produce modified halogenated aromatic polyester fibers, and then further treating said modified halogenated aromatic polyester fibers with perchloroethylene which is at a temperature of from about 80° C. up to its boiling point for a period of at least about 15 minutes to produce halogenated aromatic polyester fibers having improved solvent resistance.

2. A process for improving the solvent resistance of halogenated aromatic polyester fibers wherein said halogenated aromatic polyester contains at least some isophthaloyl halide/bisphenol isomer of the polyester, said process comprising:
  (a) heat treating said fibers at substantially constant length at a temperature of from about 270° to about 295° C. for a period of from about 5 to about 60 minutes to produce modified halogenated aromatic polyester fibers, and
  (b) further treating said modified halogenated aromatic polyester fibers with perchloroethylene which is at a temperature of from about 80° C. up to its boiling point for a period of at least about 15 minutes to produce halogenated aromatic polyester fibers having improved solvent resistance.

3. The process of claim 2 wherein the halogenated aromatic polyester has recurring units of the structural formula:

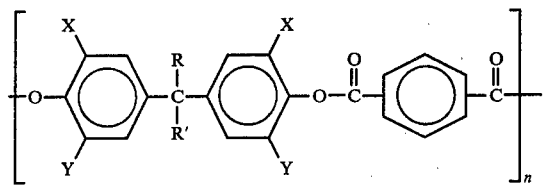

wherein X, which may be the same or different, may be chlorine or bromine, Y, which may be the same or different, may be hydrogen, chlorine, or bromine, R and R' may be the same or different and represent lower alkyl groups, hydrogen, or together constitute a cyclic hydrocarbon group, and n equals at least 10.

4. The process of claim 3 wherein R and R' may contain from 1 to about 5 carbon atoms and wherein n may be from about 40 to about 400.

5. The process of claim 4 wherein said halogenated aromatic polyester is the condensation product of tetrabromobisphenol A and an aromatic diacid chloride mixture of from about 45 to about 75 percent by weight isophthaloyl chloride and correspondingly from about 25 to about 55 percent by weight terephthaloyl chloride.

6. The process of claim 5 wherein the aromatic diacid chloride mixture comprises 60 percent by weight isophthaloyl chloride and 40 percent by weight terephthaloyl chloride.

7. The process of claim 2 wherein the halogenated aromatic polyester fibers are treated with boiling perchloroethylene for a period of at least 30 minutes.

8. A process for improving the solvent resistance of halogenated aromatic polyester fibers wherein said polyesters have recurring units of the structural formula:

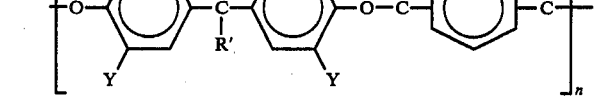

wherein X, which may be the same or different, may be chlorine, or bromine, Y, which may be the same or different, may be hydrogen, chlorine, or bromine, R and R' may be the same or different and represent alkyl groups having from 1 to about 5 carbon atoms, hydrogen, or together constitute a cyclic hydrocarbon group, and n is from about 40 to about 400, and wherein said halogenated aromatic polyesters contain at least some isophthaloyl halide/bisphenol isomer of said polyesters, said process comprising:
  (a) heat trating said fibers at substantially constant length at a temperature of from about 270° to about 295° C. for a period of from about 5 to about 60 minutes to produce modified halogenated aromatic polyester fibers, and
  (b) further treating said modified halogenated aromatic polyester fibers with boiling perchloroethylene for a period of at least 60 minutes to produce halogenated aromatic polyester fibers having improved solvent resistance.

9. The process of claim 8 wherein X is chlorine.

10. The process of claim 8 wherein X and Y are bromine.

* * * * *